Patented Sept. 3, 1940

2,213,905

UNITED STATES PATENT OFFICE 2,213,905

GEOCHEMICAL PROSPECTING

Joseph Baldwin Clark, Tulsa, Okla., assignor to Stanolind Oil and Gas Company, Tulsa, Okla., a corporation of Delaware No Drawing. Application December 4, 1939, Serial No. 307,493

9 Claims. (Cl. 88—14)

This invention relates to geochemical prospecting and more particularly to the determination of small quantities of hydrocarbon constituents in soils. It also relates, as will hereinafter appear, to the determination of hydrocarbon constituents present in certain earth formations other than soils.

It has been found that the presence of various hydrocarbons or quasi-hydrocarbons in surface soils is related to the presence of deep seated oil and gas deposits located far below those surface soils. These soil constituents which serve as indicia of the presence of deep seated petroleum deposits include gaseous, liquid and solid materials. The present invention relates principally to the determination of the liquid, gaseous and/or solid constituents, notably the former.

In making a geochemical survey, samples of the so-called surface soil are taken either at the surface or some feet below it, for instance 3 to 15 feet, in order to avoid surface contamination. Samples can be taken at still greater depths and so long as the soil sample is part of the weathered formation it is referred to as part of the surface soil. Such samples are taken at points along a survey line or at points spaced over a survey area. The survey stations can be any desired distance apart, for instance every tenth mile in a detailed survey or every quarter mile for a reconnaissance survey. Samples thus taken are analyzed in one way or another for various hydrocarbon constituents or groups of hydrocarbon constituents and the results for the various survey stations are compared in order to obtain some indication of the presence and location of deep seated oil and gas deposits which in general correspond to anomalies in the hydrocarbon composition of the surface soils.

It is an object of my invention to provide a new and improved method of geochemical prospecting. Another object of my invention is to provide a particularly rapid method of analysis of surface soils and other earth formations for hydrocarbon and quasi-hydrocarbon constituents. A still further object is to provide a method of this type by which one can rapidly determine both the quantity and the nature of hydrocarbon constituents present in surface soils and other earth formations. Other and more detailed objects, advantages and uses of my invention will become apparent as the description thereof proceeds.

Samples of surface soil taken at survey points as previously described are preferably first dried and pulverized and are then extracted with a solvent. This extraction can be carried out in various ways, for instance by leaching or by the use of a Soxhlet apparatus. The sample thus extracted is, of course, weighed before extraction. After extraction the extract freed of solid material is brought to a standardized volume or to a volume bearing a standardized relationship to the weight of the sample by addition of more of the solvent used in the extraction or by evaporation of part of this solvent.

This standardized volume of extract or a uniform portion of it is then placed in a refractometer, for instance a highly sensitive refractometer of the immersion type, and the refractive index of the solution is determined.

In one of the simplest applications of my invention, this procedure is repeated for each of the samples taken in a survey (or for each of a series of composite samples taken in such a survey) and the refractive indices are plotted or compared for the various survey stations in order to obtain an indication of the presence and location of deep seated hydrocarbon deposits located far below the surface soils.

Assuming that the hydrocarbon constituents of the various samples taken in the course of a given survey are similar in kind and further assuming that a solvent is chosen having a refractive index substantially different from the average refractive index of the hydrocarbon constituents, it will be apparent that the deviations of the measured refractive indices from the refractive index of the pure solvent will be a direct measure of the amounts of such hydrocarbon constituents in the various samples and the refractive index figures themselves or the deviations previously referred to can be used directly in the preparation of maps or for other comparative purposes.

On the other hand, it is also possible and usually preferable to translate these results into actual percentages of hydrocarbon constituents. This can be done by extracting a very large representative or composite soil sample with the solvent chosen in order to obtain a large supply of the hydrocarbon material. The extract thus obtained can be evaporated and the hydrocarbon constituents can be used to make up standard solutions of various concentrations of these hydrocarbon constituents in the solvent chosen in order to secure reference standards, reference data or a reference curve by comparison with which the refractive indices determined in the course of the survey can be translated into percentages of hydrocarbon or quasi-hydrocarbon constituents.

It will be understood, of course, that any solvent or solvent mixture having certain solvent properties for hydrocarbon constituents of soils or other earth formations can be used so long as the solvent or solvent mixture chosen has a refractive index substantially different from that of the hydrocarbon constituents present. Just how different the refractive indices must be is determined, of course, by the sensitivity of the refractometer available and by the accuracy desired in the particular survey. Refractometers of extreme sentitivity and accuracy giving results to five or even six significant figures are known to the art and therefore it is not usually necessary to choose a solvent having a refractive index radically different from that of the hydrocarbon or quasi-hydrocarbon constituents.

When greater accuracy is desired or when the refractometer available is not highly sensitive, a solvent of very high refractive index such as carbon disulfide can be used. The refractive index of carbon disulfide expressed in terms of the D line of the sodium spectrum is 1.6295 which is much higher than that of the hydrocarbon constituents present in the soil. Other solvents of exceedingly high refractive indices are the brominated hydrocarbons. Thus symmetrical dibromoethane has a refractive index of 1.5379 while the corresponding unsymmetrical compound has a refractive index only slightly lower. The tetrabromoethanes have still higher refractive indices of the same order as that of carbon disulfide. One disadvantage of these solvents of very high refractive index is that most if not all of them have very high solvent powers for most types of organic matter and therefore tend to extract vegetable as well as hydrocarbon constituents of the soil. This difficulty can be minimized by taking soil samples at a depth of 5 or 10 feet or at other depths sufficiently low to contain very little vegetable matter. It can also be minimized by using solvents of more selective solvent power, notably hydrocarbon solvents which in gentral have a selective solvent action on hydrocarbon constituents and have low solvent power for more complex organic compounds.

In general the refractive indices of the paraffin hydrocarbons are low. The refractive indices of the olefin hydrocarbons are notably higher and further large increases in refractive index occur as we progress first to cyclo-paraffinic or naphthenic hydrocarbons and then to aromatic hydrocarbons. Thus, if a solvent of somewhat less general solvent power than carbon disulfide is desired, benzene having a refractive index of 1.5014 in terms of the D line of the sodium spectrum is suitable but where highly sensitive refractometers are available cyclohexane having a more selective solvent power and a refractive index of 1.4312 is sometimes preferable.

Pure paraffin hydrocarbon solvents having lower instead of higher refractive indices than the average refractive index of the hydrocarbon constituents present in the earth formation can be used to high advantage, particularly since they have very little solvent power on organic constituents of earth formations other than the hydrocarbon constituents with which I am primarily concerned. In the paraffin series of hydrocarbons the refractive index tends to increase with increasing density and molecular weight and it is therefore desirable to use a low molecular weight solvent such as pentane which has a refractive index of 1.3570. Still lighter solvents such as propane and butane can be used but are difficult to handle on account of their excessive volatility.

Since small amounts of water present in solvents affect the refractive index substantially, I prefer to avoid errors from this source by having all samples either water-saturated or anhydrous before measurements are made. Thus the extract can either be bubbled through a water column or passed over a dehydrating agent before measuring the refractive index so that all measurements in a given survey will be comparable. If water is used, it should preferably be substantially free of dissolved salts, as these change the refractive index of the water-saturated solvent.

As hereinbefore described, the process of my invention determines only the relative amounts of hydrocarbon constituents and assumes that these hydrocarbon constituents have a constant average refractive index from sample to sample. For many purposes this is entirely sufficient and has the advantage of providing an extremely rapid and at the same time very accurate technique.

However, it is desirable to do more than this and I have also provided a method for using refractive index determinations to measure both the quantity and the nature of hydrocarbon or quasi-hydrocarbon constituents present in surface soils or other earth formations. One way of doing this is to segregate the actual hydrocarbon constituents by evaporating a solvent and then make a direct determination of the refractive index. This, however, is normally completely impractical and out of question as a method to be applied to each of a large number of samples since the hydrocarbon constituents in the samples with which I deal are usually present only in small traces and in order to secure a sample sufficiently large for direct determination it would involve samples of enormous size and extraction plants on a prohibitive scale. However, I find that all the advantages of a system in which the refractive indices of hydrocarbon constituents are directly determined can be obtained by means of a very simple procedure.

This procedure is based on the principle that if two miscible liquids having the same refractive index are mixed and no chemical action is involved, this mixture will have the same refractive index as did each of the two constituents. Applying this principle, if a given sample were extracted with each of a number of solvents of varying refractive indices and the refractive indices of the extracts were measured, one would be found in which the extract had substantially the same refractive index as the original solvent. This would indicate that the refractive index of the hydrocarbon constituents was substantially the same as the refractive index of this particular solvent. In this way the actual average refractive index of the hydrocarbon constituents would be roughly determined. Having this figure and having a figure for the refractive index of an extract made with a solvent having a different refractive index, it would be possible to determine the amount as well as the character of the material. Thus for instance, if on extracting a given soil sample with cyclohexane it was found that the extract had substantially the same refractive index as the original solvent it would be apparent that the average refractive index of the extracted constituents was roughly 1.4312. If it were then found that a given weight of soil extracted with pentane and adjusted by the addition of pentane to or the evaporation of pentane from the extract to give a pentane solution having a weight equal to that of the original sample so that the percentage of soil hydrocarbons in the extract was the same as in the soil and if it were then found that the extract had a refractive index of 1.3575 as compared with a refractive index of 1.3570 for pure pentane, we could calculate the amount of a hydrocarbon constituent having a refractive index of 1.4312 required to raise the refractive index of pentane from 1.3570 to 1.3575 and would come to the conclusion, assuming a straight line relationship between composition and refractive index, that the original sample contained approximately 0.4% of the hydrocarbon constituents.

This procedure has the obvious disadvantage of making it necessary to extract with different solvents until one is found which has substantially the same refractive index both before and after the extraction operation. This is usually impractical and the procedure which is preferred is to use a mixture of solvents, one having a refractive index lower than the average refractive index of the hydrocarbon constituents and the other having a refractive index higher than the average refractive index of the hydrocarbon constituents. These two solvents can then be mixed in various proportions in order to find a proportion which has the same refractive index as the hydrocarbon constituents. This can be done conveniently by means of what may be referred to as an optical titration.

Thus for example, the two solvents used can be pentane, having a refractive index of 1.3570, and carbon disulfide, having a refractive index of 1.6295. Various mixtures of these two solvents can be made up and the refractive indices can be determined and a curve can be plotted of refractive index against composition starting on one side with 0% pentane and 100% carbon disulfide and extending on the other side to 100% pentane and 0% carbon disulfide. The sample to be tested can then be extracted with pentane and the extract can be brought to a standard volume, for instance 100 cc. of solvent contaminated with hydrocarbon material and this may be placed in a cell at the bottom of the optical system of a refractometer. This cell should be equipped with a stirring mechanism and a burette or other means for introducing measured increments of carbon disulfide. Carbon disulfide can then be titrated in while measuring the refractive index of the solution and a curve can again be plotted of the refractive index of this solution against the volume percentage of carbon disulfide. This curve will correspond to the one previously described but will, of course, start at a higher refractive index value for 0% carbon disulfide since the hydrocarbon constituents extracted from the earth formation have a higher refractive index than that of pentane. However, a point will be reached at which the refractive index for a given percentage of carbon disulfide present in the mixture will be equal to that for the same percentage of carbon disulfide mixed with pure pentane. In other words the two curves will cross at a refractive index value which will, of course, be the average refractive index of the hydrocarbon constituents extracted from the sample of earth formation.

Since the point at which these two curves cross gives the refractive index of the extracted material which is indicative of its chemical nature and since the originally measured refractive index of the pentane extract gives a rough measure of the amount of extracted material we have obtained two figures, one relating to character and one to amount. Calibration curves can, of course, be worked up so that the amount of hydrocarbon material measured in accordance with my method can be corrected in view of the determination of the actual refractive index of this material.

In the preceding discussion my invention has been described with particular reference to the use of my method in geochemical prospecting by the analysis of samples of the surface soil. It is also applicable, however, to prospecting techniques other than that described and to the analysis of earth formations other than surface soils.

Thus, for instance, it has been found that when an oil well is being drilled small traces of oil are usually encountered a considerable distance above the point at which the drill bit actually penetrates an oil-bearing formation. It is highly advantageous to know when the oil-bearing formation is being approached so that when one actually drills into the oil-bearing formation one will avoid the danger of mudding off this formation, the danger of a blow out and other possible dangers encountered at this stage of the operation.

In this type of well logging operation samples of the drill cuttings brought to the surface in the course of the drilling operation can be extracted with a solvent exactly as described above for soil samples and successive samples can be analyzed by one of the various refractive index techniques above described. In essence this method is a geochemical prospecting technique in which samples are taken from vertically spaced points instead of horizontally spaced points.

Earth formations recovered by a core drill can be analyzed very advantageously by the methods above described. Cores have long been taken from oil-bearing formations or formations which may be oil-bearing and it is desirable to determine the amount of oil present and also something about its chemical and physical nature. Previously available methods for determining core saturation have been time-consuming and uncertain while the method above described can be applied to cores with ease, rapidity and accuracy in the same fashion as with soil samples.

While I have described my invention in connection with certain preferred embodiments thereof, it is to be understood that these are by way of example rather than by way of limitation and I do not mean to be restricted thereto but only to the scope of the appended claims in which I have defined my invention.

I claim:

1. The method of examining geological formations for sub-surface hydrocarbon deposits which comprises collecting a plurality of geological samples from predetermined spaced sample stations, extracting each of said samples with an organic solvent material having a known refractive index which is substantially different from the refractive index of the hydrocarbons to be extracted and having a solvent action on hydrocarbons, and determining the refractive indices of each of the solutions thus obtained whereby the variations in refractive index from sample station to sample station resulting from the dissolved hydrocarbons in the extracts may be determined to provide data for evaluation of the presence of sub-surface hydrocarbon deposits.

2. A method as defined in claim 1 in which the geological samples are collected from a plurality of spaced points adjacent the surface of the terrain.

3. A method as defined in claim 1 in which the geological samples are collected from a plurality of spaced points progressively remote from the surface of the terrain.

4. A method as defined in claim 1 in which the geological samples are collected at progressively deeper points in a well.

5. A method as defined in claim 1 in which the refractive index determination of said extracts is made after adjusting the water content of each of said extracts to a standard basis.

6. The method of examining geological formations for sub-surface hydrocarbon deposits which comprises collecting a geological sample from a predetermined sample station, extracting said sample with an organic solvent material having a known refractive index which is substantially different from the refractive index of the hydrocarbons to be extracted, and having a solvent action on hydrocarbons, and determining the refractive index of the solution thus obtained whereby the variation in refractive index resulting from the dissolved hydrocarbons in the extract may be determined to provide data for evaluation of the presence of sub-surface hydrocarbon deposits.

7. The method of examining geological formations for sub-surface hydrocarbon deposits which comprises collecting a plurality of geological samples from predetermined spaced sample stations, dividing each sample into a plurality of portions and extracting each portion with one of a plurality of different solvents for hydrocarbons having known refractive indices, determining which said solution of a portion of said sample has substantially the same refractive index in the presense as in the absence of said extracted material, whereby the variation in refractive index from sample station to sample station resulting from the dissolved hydrocarbons in the extracts may be determined to provide data for evaluation of the presence of sub-surface hydrocarbon deposits.

8. The method of examining geological formations for sub-surface hydrocarbon deposits which comprises collecting a plurality of geological samples from predetermined spaced sample stations, extracting the said samples with a solvent material having a known refractive index which is substantially different from the refractive index of the hydrocarbons to be extracted and having a solvent action on hydrocarbons, and optically titrating the solutions thus formed with measured amounts of a different solvent material of known refractive index which is substantially different from the refractive index of the hydrocarbons which have been extracted to determine the solvent mixture which has a refractive index independent of the presence therein of said extracted hydrocarbons, whereby the variations in refractive index from sample station to sample station resulting from the dissolved hydrocarbons in the extracts may be determined to provide data for evaluation of the presence of sub-surface hydrocarbon deposits.

9. The method of examining geological formations for sub-surface hydrocarbon deposits which comprises collecting a plurality of geological samples from predetermined spaced sample stations, drying and pulverizing the said geological samples, then extracting the same quantity of each of said samples with a standard volume of an organic solvent material having a known refractive index which is substantially different from the refractive index of the hydrocarbons to be extracted and having a solvent action on hydrocarbons, and determining the refractive indices of said extracts under standardized and comparable conditions of temperature and water content whereby the variations in refractive index from sample station to sample station resulting from the dissolved hydrocarbons in the extracts may be determined to provide data for evaluation of the presence of sub-surface hydrocarbon deposits.

JOSEPH BALDWIN CLARK.